(12) United States Patent
Lagercrantz (10) Patent No.: US 8,998,721 B2
(45) Date of Patent: Apr. 7, 2015

(54) METHOD AND ARRANGEMENT FOR IMPROVED CLIENT EXTENSION MANAGEMENT

(75) Inventor: Henrik Lagercrantz, Uppsala (SE)

(73) Assignee: Ongame Services AB, Stockholm (SE)

( * ) Notice: Subject to any disclaimer, the term of this patent is extended or adjusted under 35 U.S.C. 154(b) by 144 days.

(21) Appl. No.: 13/322,013

(22) PCT Filed: Mar. 24, 2010

(86) PCT No.: PCT/SE2010/050325
§ 371 (c)(1),
(2), (4) Date: Nov. 22, 2011

(87) PCT Pub. No.: WO2010/140953
PCT Pub. Date: Dec. 9, 2010

(65) Prior Publication Data
US 2012/0071230 A1    Mar. 22, 2012

(30) Foreign Application Priority Data

Jun. 3, 2009 (SE) ...................................... 0950403

(51) Int. Cl.
*G06F 17/00* (2006.01)
*H04L 29/06* (2006.01)
*G07F 17/32* (2006.01)

(52) U.S. Cl.
CPC ............... *H04L 63/08* (2013.01); *G07F 17/32* (2013.01); *G07F 17/3293* (2013.01); *H04L 63/101* (2013.01)

(58) Field of Classification Search
CPC ..... A63F 13/12; A63F 13/02; G07F 17/3202; G07F 17/3223

USPC ...................................................... 463/42–43
See application file for complete search history.

(56) References Cited

U.S. PATENT DOCUMENTS

| 6,036,601 | A | 3/2000 | Heckel | |
| 8,449,394 | B2 * | 5/2013 | Buchholz et al. ............... | 463/42 |
| 2002/0094869 | A1 * | 7/2002 | Harkham ........................ | 463/42 |
| 2003/0211889 | A1 * | 11/2003 | Walker et al. ................... | 463/42 |
| 2005/0164793 | A1 * | 7/2005 | Merimovich et al. ........... | 463/42 |

(Continued)

FOREIGN PATENT DOCUMENTS

WO    WO 2008/156809    12/2008

OTHER PUBLICATIONS

International Search Report for PCT/SE2010/050325, mailed Oct. 6, 2010.

(Continued)

*Primary Examiner* — Steven J Hylinski
(74) *Attorney, Agent, or Firm* — Nixon & Vanderhye P.C.

(57) ABSTRACT

A poker gaming server configured to support a plurality of connected poker clients and a plurality of connected operator servers, each said poker client being associated with at least one of said plurality of operator servers, said poker gaming server comprising a gaming data feed unit configured for providing a gaming data feed relating to each connected poker client to its respective associated operator servers, a notification unit configured for receiving and forwarding client notifications to a connected poker client from its associated operator server, and an authentication unit configured for authenticating at least one of a plurality of operator specific extension units upon request from a connected poker client.

22 Claims, 8 Drawing Sheets

(56) References Cited

U.S. PATENT DOCUMENTS

| | | | |
|---|---|---|---|
| 2005/0209001 A1* | 9/2005 | Moshal | 463/42 |
| 2006/0003841 A1* | 1/2006 | Kobayashi et al. | 463/42 |
| 2006/0135235 A1* | 6/2006 | Willis et al. | 463/1 |
| 2008/0082985 A1* | 4/2008 | Gagner et al. | 719/312 |
| 2008/0167124 A1 | 7/2008 | Korschemniy et al. | |
| 2010/0016082 A1* | 1/2010 | Prochnow | 463/42 |
| 2010/0178980 A1* | 7/2010 | Tyler | 463/29 |

OTHER PUBLICATIONS

International Preliminary Report on Patentability with 2 Amended Sheets, dated Apr. 11, 2011.

\* cited by examiner

METHOD AND ARRANGEMENT FOR IMPROVED CLIENT EXTENSION MANAGEMENT

This application is the U.S. national phase of International Application No. PCT/SE2010/050325, filed 24 Mar. 2010, which designated the U.S. and claims priority to SE Application No. 0950403-6, filed 3 Jun. 2009, the entire contents of each of which are hereby incorporated by reference.

TECHNICAL FIELD

The present invention relates to online gaming systems in general, and specifically to methods and arrangements for managing extensions in a poker gaming system.

BACKGROUND

At present online gaming services e.g. poker, are evolving rapidly, contributing to an increase in demand for online gaming servers with various functional features. For most present day online gaming systems most of the functionality is enabled in the core part of the gaming system. Any addition of further functionalities typically requires an upgrade or adaptation of the core parameters or system. This is typically a costly and time-consuming process.

For the case of so-called B2B (business to business) poker servers, the duplicity of the problem can be summarized according to the following. On one hand a plurality of operators need to cooperate to build a large player or client base e.g. liquidity. On the other hand, each operator wants to diversify himself in order to compete with the other operators. This diversification is not limited to look and feel, but rather includes complex interaction between the poker client and the operator. Some of the examples of such interactions follow below:

Poker strategy advisor that analyses the player's game play after each hand to provide feedback.
A graphic area that streams a soccer game and allows the player to place live bets.
Advertising
Animated logos
Avatar icons that opens the players profile when clicked Traditionally client applications are extended using a plug-in concept where new functionality can be added to the existing core feature set. Plug-ins may interact with the application through well defined APIs to provide an integrated experience for the user.

For most present day on-line gaming systems most of the functionality of the system is enabled in the core system of the gaming system. Any addition of further functionalities typically requires an upgrade or adaptation of the core parameters or systems. This is typically a costly and time consuming process. In particular, a gaming system or gaming server is typically associated with a number of various gaming clients at different operators. Each such client and/or operator potentially wants to add functionality, advertisements, and specific services for their own customers or for all customers of the gaming server. However, each such addition requires a change in the gaming system core, no matter how small a change it is. Thus, any addition of functionality is costly and time consuming.

Therefore, there is a need for methods and arrangements enabling adding operator specific client functionality or extensions without necessitating a core upgrade.

SUMMARY

A basic aspect of the present invention provides an improved poker gaming server.

A further aspect of the present invention provides improved operator influence on the gaming experience.

A poker gaming server 1 is configured to support a plurality of connected poker clients and a plurality of connected operator servers, each of the poker client are associated with at least one of the plurality of operator servers. The poker gaming server includes a gaming data feed unit 10 configured for providing a gaming data feed relating to each connected poker client to its respective associated operator servers, a notification unit 11 configured for receiving and forwarding client notifications to a connected poker client from its associated operator server, and an authentication unit 12 configured for authenticating at least one of a plurality of operator specific extension units upon request from a connected poker client.

Advantages of the embodiments of the present invention include improved operator specific influence on the gaming experience, and reduced need for core upgrades in the poker gaming server to enable operator specific extensions.

BRIEF DESCRIPTION OF THE DRAWINGS

The invention, together with further objects and advantages thereof, may best be understood by referring to the following description taken together with the accompanying drawings, in which.

DETAILED DESCRIPTION

The present disclosure mainly concerns an online poker gaming system, but is of course applicable to other online games as well wherein multiple players are associated with a plurality of operators and utilizing one or several common game servers.

Described with a different perspective, the present disclosure presents methods and arrangements for enabling non-core functionalities or extensions in a gaming system without necessitating an upgrade of the core functionalities or software versions implemented in the core functionality. In this context, the core functionality is the functionality provided by the poker or gaming server.

Although the previously described extension plug-in approach is suitable for the majority of client applications, it is not sufficient for the presently described B2B poker scenario. There are several reasons for this:

Poker is a multi-player game, which means that most of the events are generated on the server-side and pushed to the client application. A plug-in will not be able to act by it self but must also be able to process events that are generated externally and fed to the plug-in. For example, a plug-in may need to act when it receives an event, informing that a new player has just joined the poker table.

Plug-ins must be able to combine information from both server and client-side.

Client plug-ins must be operator specific and act outside the scope of the B2B poker system. A plug-in may for example need utilize on operator specific information like the player's birthday, information that is normally not known by the B2B poker system.

Operators must be able to communicate with targeted players (plug-ins) directly, e.g. request an animation to be played on the player's client when he/she wins with a straight flush.

The main problem with prior art implementations of plug ins or extensions, has been the need to change or upgrade the functionality of the poker or gaming server for each new extension. This can, as anyone skilled in the art realizes, become a monumental task if each operator desires to implement not only one but also several extensions. Another problem then becomes to update an implemented extension at the poker server upon request from the "owner" of the extension i.e. the operator. It is therefore desirable to enable a solution, which maintains the responsibility for the extension with the owner of the extension e.g. the operator or operator server, and only requires the poker server to approve or authenticate each extension through the intricate use of APIs.

In order to overcome the above described problems with prior art plug in the present disclosure proposes, among other things, a set of APIs and a framework that allow client extensions to execute and integrate seamlessly with operator specific server-side logic, outside the scope of the B2B poker system. In other words, a poker gaming server according to the present invention needs to be configured to allow operator specific extensions within a set bound of rules e.g. framework.

The solution according to embodiments of the present invention is specifically designed to consider and address the following issues:

Extension flexibility. An extension or plug in must be able to combine client and server logic without being limited by boundaries set by the B2B poker server system.

Extensions must have access to, and be able to act on, both operator specific data as well as B2B poker specific data in near real-time.

Solution must support extension specific server-to-client communication (push). More specifically, strict versioning and possibility for adaptation of the communication protocol based on client type/version should be handled.

The extension framework must be well defined and secure to guarantee that the B2B poker system is protected against malicious or malfunctioning extensions.

The present disclosure relates to an online gaming system with improved operator specific extension capability. In particular, the present disclosure concerns an online poker server with capabilities to allow operator specific extensions and provide notification services e.g. relaying of notifications enabling direct exchange of information between the operators and associated clients.

In other words, the present disclosure presents methods and arrangements for enabling non-core functionalities or extensions in an online gaming system without necessitating an upgrade of the core functionalities or software versions implemented in the core functionality i.e. poker server.

A typical online poker system comprises at least one poker server that provides the actual poker tables and game mechanisms. A plurality of game operators or operator servers utilizes the poker server or poker servers to provide online gaming to one or a plurality of associated users or clients. According to known measures, the poker server(s) does not store any information about the connected players or clients; it only maintains information concerning each table played so called game data. However, the server provides game data as input to its connected operator servers.

With the present invention, the system, and in particular the poker server, is adapted to provide an improved gaming experience for the connected players as well as to increase the influence for each connected operator server on the gaming experience for its associated clients.

Figure 1:
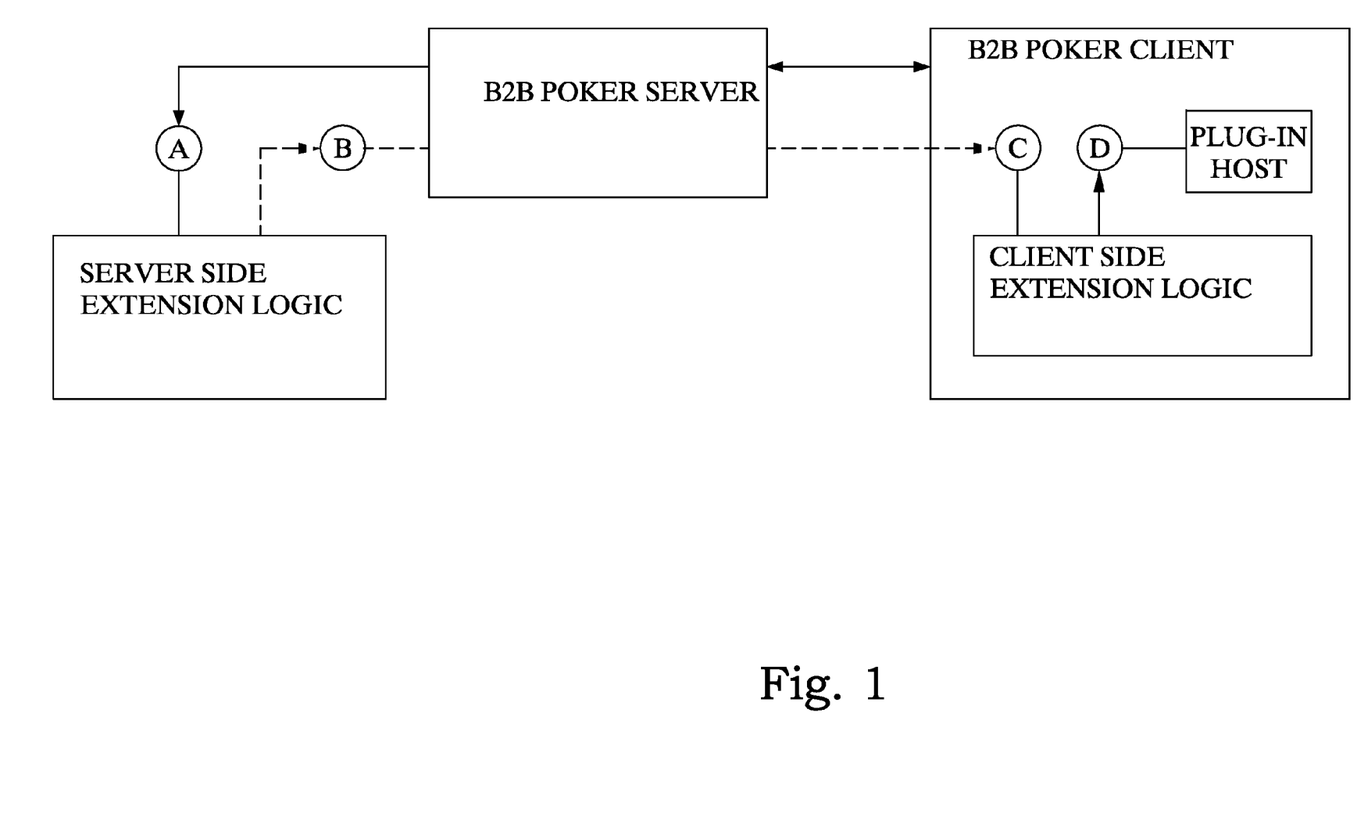
FIG. 1 is a schematic block figure of an embodiment of a system according to the present invention.

In a general illustration of the present invention, with reference to FIG. 1, an online poker system comprises a B2B poker server, a connected poker client or player, and an operator server with server-side extension logic. The poker client includes client side extension logic and extension or plug-in host. The various APIs or interfaces are indicated by the letters A, B, C, and D.

Figure 2:
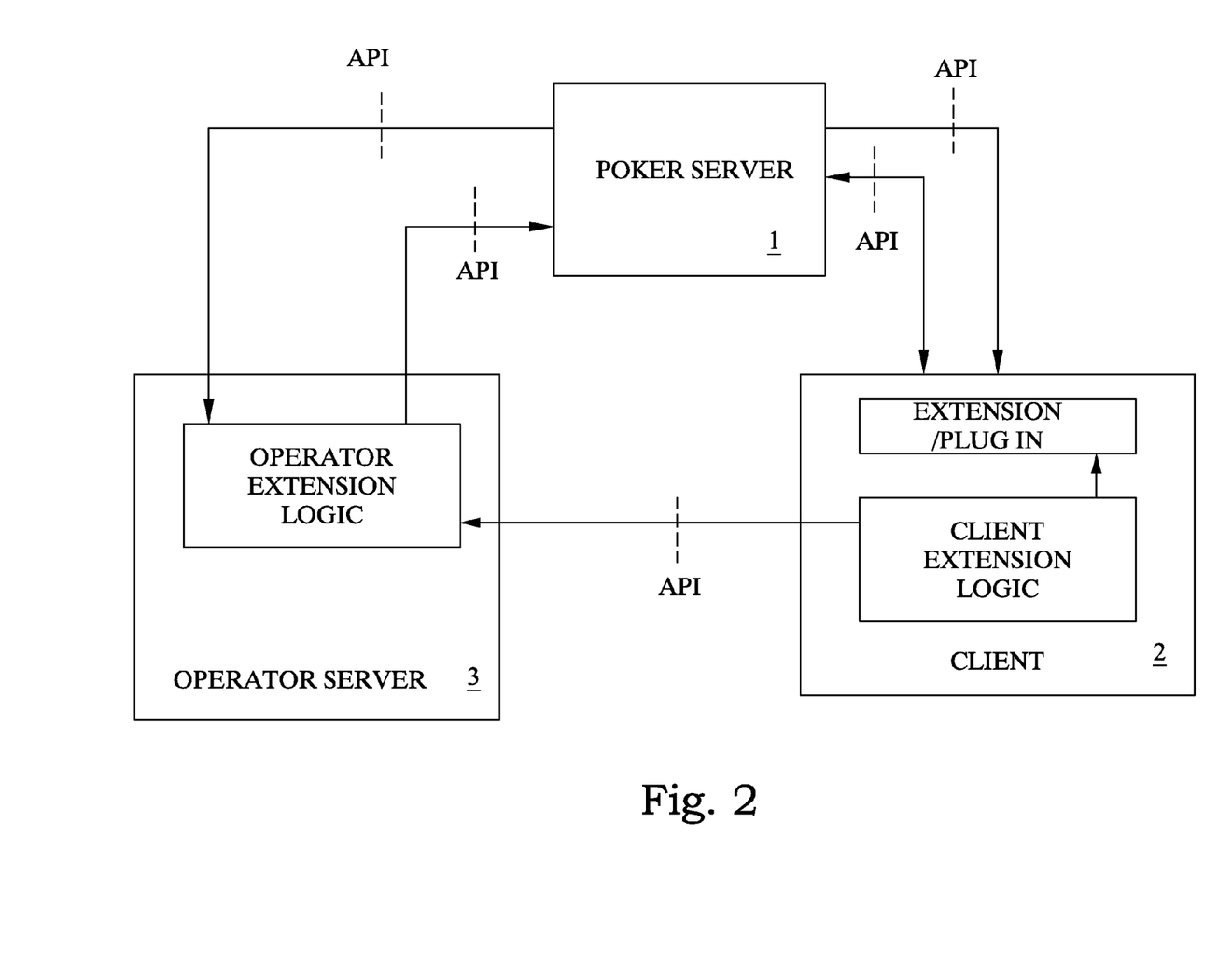
FIG. 2 is a further schematic block figure of an embodiment of a system according to the present invention.

In particular, and with reference to FIG. 2, the online poker system comprises at least one poker server 1 which provides a gaming environment for a plurality of operator or operator servers 3 and their associated clients or players 2. According to the present invention, the poker server 1 is adapted to provide a game data interface (API) for communicating game data to each connected operator server 3. Further, the poker server 1 is configured to provide a notification interface (API) for receiving client notifications from the operator servers 3, and a notification interface (B) for forwarding or relaying received notifications to a connected client 2. In addition, the poker server 1 is adapted to provide an authentication interface for authenticating client extensions, either during a start up procedure in which a client connects to the server for the first time, or in response to a relayed client notification.

According to the present invention, the operator server 3 includes a server side extension control unit for managing operator specific extensions implemented at its associated clients, or at least one client. The operator server 3 is adapted to receive game data through the game data interface (API) from the poker server. In response to a particular pre-set game data for one or more of its associated clients, the operator server 3 is adapted to provide a client notification message by push to the notification interface (API) at the poker server. The client notification message is intended for a targeted client. In addition, the operator server 3 comprises an interface (API) configured to exchange extension information with a notified client.

Further, at least one client or user comprises a plug in unit or extension unit and a client side extension control unit for executing and managing operator specific extension functionality. The client 2 is adapted to receiving push client notifications through a notification interface (API) from the poker server 1. In response to receiving such a message, the client extension logic is adapted to contact the originating operator server 1 through an extension information interface (API). Further, the client side extension unit is adapted to request authentication of extensions from a notifying poker server 1, either in response to a client notification or during start up and connection to the poker server.

To provide more in-depth information about the various constituents of the present disclosure, the different interfaces and units will be described below.

Server-Side Data Feed

The extension framework includes a server-side data feed interface (API) from the B2B poker server to the operator's server-side extension logic (A). All relevant events occurring in the poker server will be published on this feed or interface, e.g. completed poker rounds.

The feed can be analyzed by the server-side extension logic to for example detect when a specific hand has been dealt— As this happens, the extension may trigger a notification using the client notification API (B) described in further detail below.

Client Notification API

The B2B poker server exposes a notification interface (API) where operators may trigger a notification to a connected player (B) or client. The notification is asynchronous and does not contain any operator specific data except a reference to the sender, i.e. the server-side extension logic or operator server.

As a notification is triggered, the B2B poker server looks up the targeted player in its set of connected players and forwards the notification to the targeted or associated client (C). The notification will be dropped without notice in the case where the targeted player is not currently connected.

Client Extension API

Each extension plug-in at the client side must implement the plug-in API defined by the B2B poker client (C). Among other things, the plug-in API contains methods to carry the notification from the server-side extension logic.

As a notification is picked up by the client-side extension logic, it will check the sender reference. If the sender is the server-side extension logic it will establish a connection directly to the server-side component e.g. server side extension logic, thereby bypassing the B2B poker system. When connected, the client and server can exchange information about the client type/version in use. The client extension logic will also "ask" the server-side logic (e.g. operator server extension logic) about what action to take for this specific notification. This could for example result the client downloading an animation to be played.

Client Host API

Each extension plug-in will have access to a set of functions provided by the B2B poker client. These functions are exposed through the Client Host API (D). Most importantly, client-side extension logic is able to access the logical model managed by the B2B poker client, e.g. see cards at the poker table, information about opponents etc. The extension logic may also use the API to access graphics surfaces and other UI components for presentation and player interaction purposes.

By using this API, client extensions may act on data- or events produced by the B2B poker system and display information to the player. An extension may for example add an icon next to each opponent's avatar. As the icon is clicked the extension could request more detailed player information from a server-side extension component, owned and managed by the operator.

Figure 3:
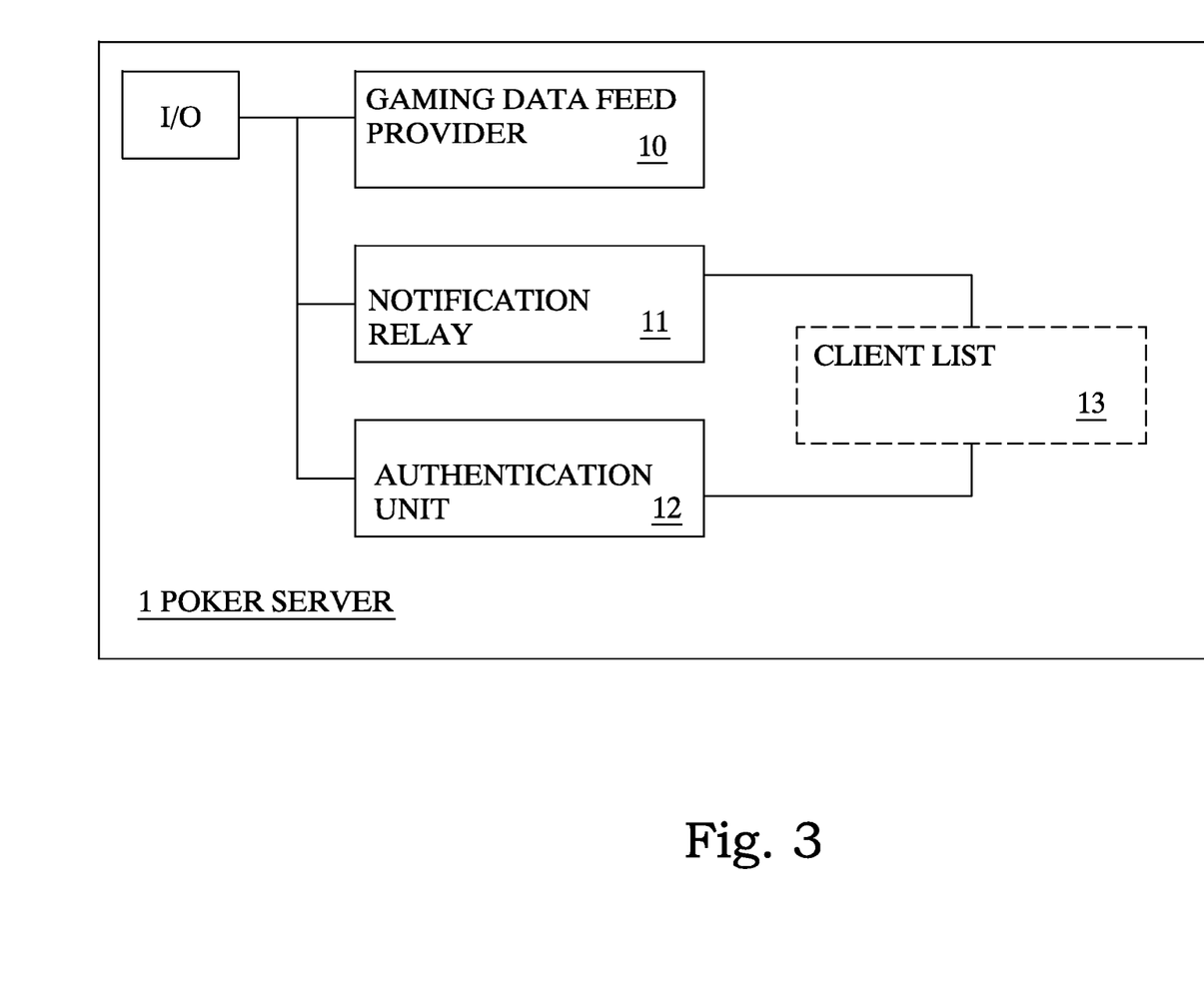
FIG. 3 is an illustration of an embodiment of a poker server according to the present invention.

With reference to FIG. 3, an embodiment of a poker server 1 suitable for use in the previously described system according to the present invention will be described. The poker server 1 includes a general input output unit and further common functionality for receiving and transmitting data in the system (not shown). Further, the poker server 1 includes a gaming data feed providing unit 10 which serves to provide gaming data for each connected client to its associated operator server. The data feed includes information concerning the game such as what cards that have been played, bets that have been made, winner etc. The gaming data feed unit is adapted to provide this data via the previously interface A to the operator server(s). In addition, the poker gaming server 1 includes a notification relay unit 11, which receives notifications intended for a specific client or clients from an operator server, and relays the notification to connected clients. Notifications are received via an interface B from the operator server and forwarded via a different interface C to the addressed client. Finally, the poker gaming server 1 includes an authentication unit 12, which manages authentication of operator specific extensions upon request from connected poker clients. Thus, the poker server does not itself contain any extension functionality, only information whether extensions are allowable or not.

To further aid the authentication process, the authentication unit is adapted to maintain and update a list of allowable operator specific client extensions for the operators' servers. If a clients requests authentication of a non-listed extension, the poker servers ignores the request. Similarly, if the poker server receives a notification intended for a client that is not connected to the poker server, the poker server ignores the notification. To aid this, the poker server may include a client list unit 13 which maintains and updates a list of all clients connected to the poker gaming server.

Although the various functional entities of the poker servers have been described as separate units, it is equally possible that the entities are combined into larger units located within or outside the poker server.

Figure 4:
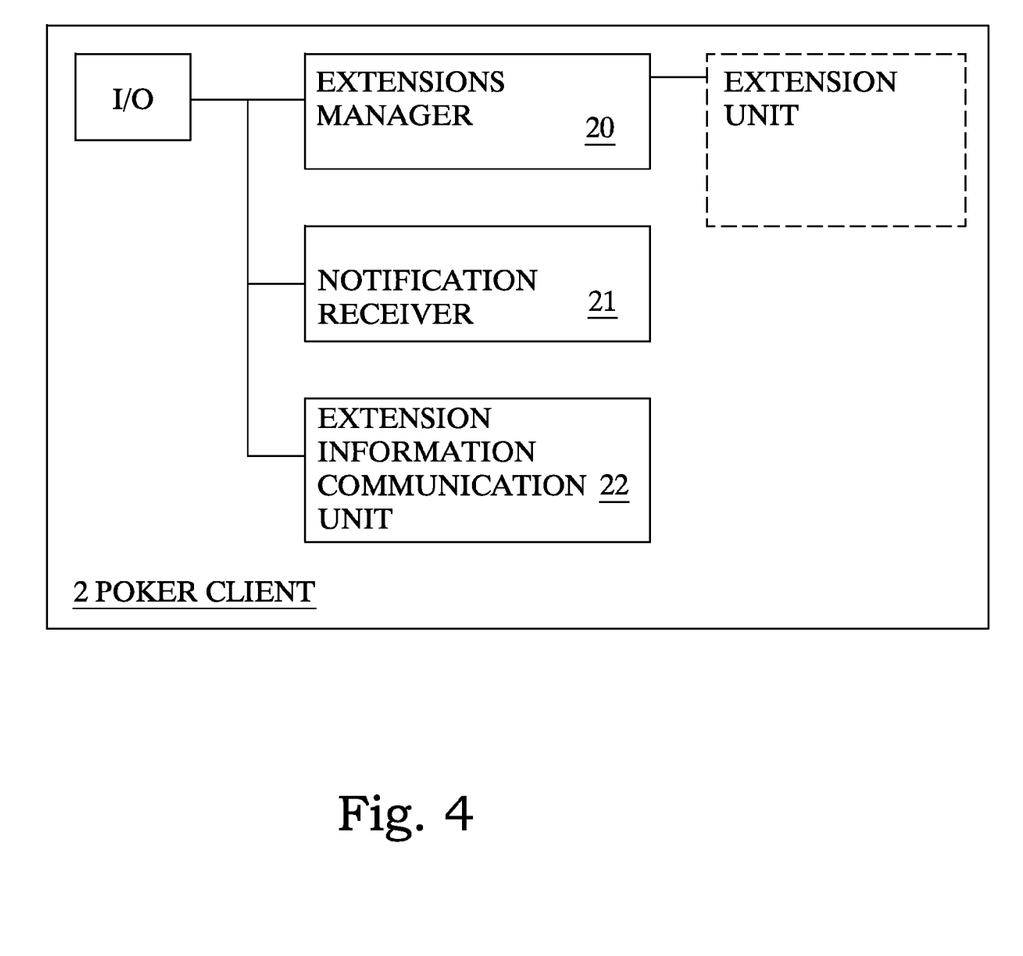
FIG. 4 is an illustration of an embodiment of a poker client according to the present invention.

With reference to FIG. 4, an embodiment of a poker client 2 according to the present invention will be described. The poker client 2 includes a general input output unit I/O and further common functionality for receiving and transmitting data in the system (not shown). In particular, the client 2 includes an extension managing unit 20 configured to manage and authenticate operator specific extensions or plug-ins. Also shown in the figure is an extension unit, which houses the extension specific functionality of authenticated extensions. Further, the client 2 includes a notification unit 21 for receiving client notifications relayed from its associated operator server via a poker gaming server. Finally, the client 2 includes a communication unit 12 for communicating directly with its associated operator server upon receiving a notification.

Figure 5:
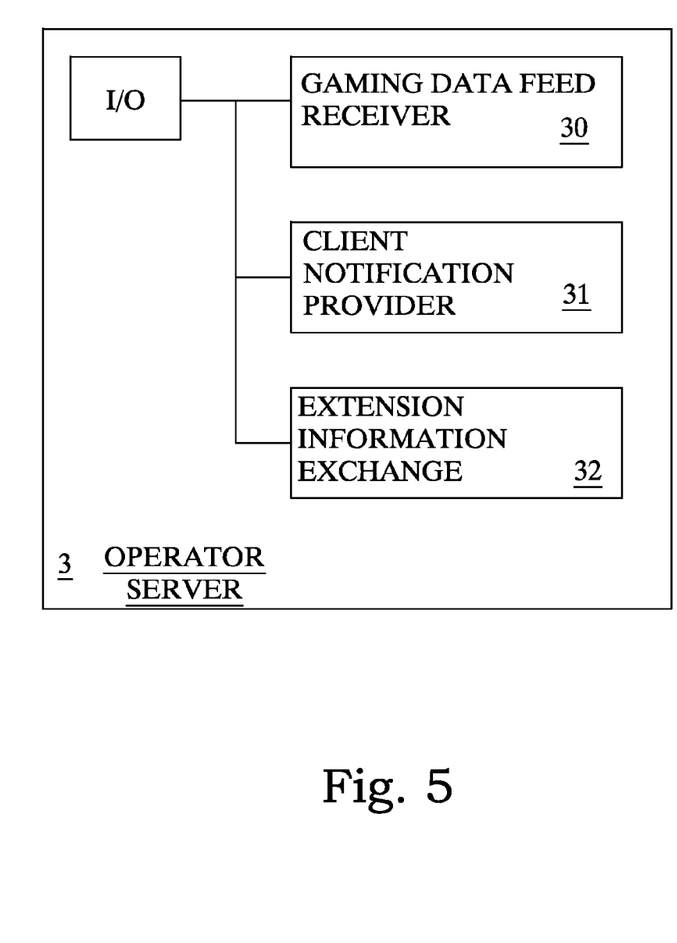
FIG. 5 is an illustration of an embodiment of an operator server according to the present invention.

With reference to FIG. 5, an embodiment of an operator server 3 according to the present invention will be described. The operator server 3 includes a general input output unit I/O and other well known functionality for exchanging data with external sources and exchanging data between internal units. In addition, the server 3 includes a unit 30 for receiving a gaming data feed from a poker gaming server, the feed is related to all games in which clients associated with the operator server and that are connected to the poker gaming server are participating. Further, the operator server 31 includes a client notification unit, which is adapted to provide client notifications relating to specific extensions to an associated poker client in response to a received gaming data feed. The notification is for most cases a simple push message informing the client that it should contact its operator server directly. Finally, the operator server 3 includes an extension information unit 32, which is adapted to exchange extension information with an associated client upon request.

Example Extension and Communication Flow

The following example is intended to explain the main integration points and outline the capabilities of the client extension framework.

An operator wants to be unique and have introduced a new extension, referred to as the "bad-beat-o-meter". The bad-beat-o-meter continuously tracks the player's completed poker rounds and displays a graphical meter showing how "unlucky" the player has been so far.

Figure 6:
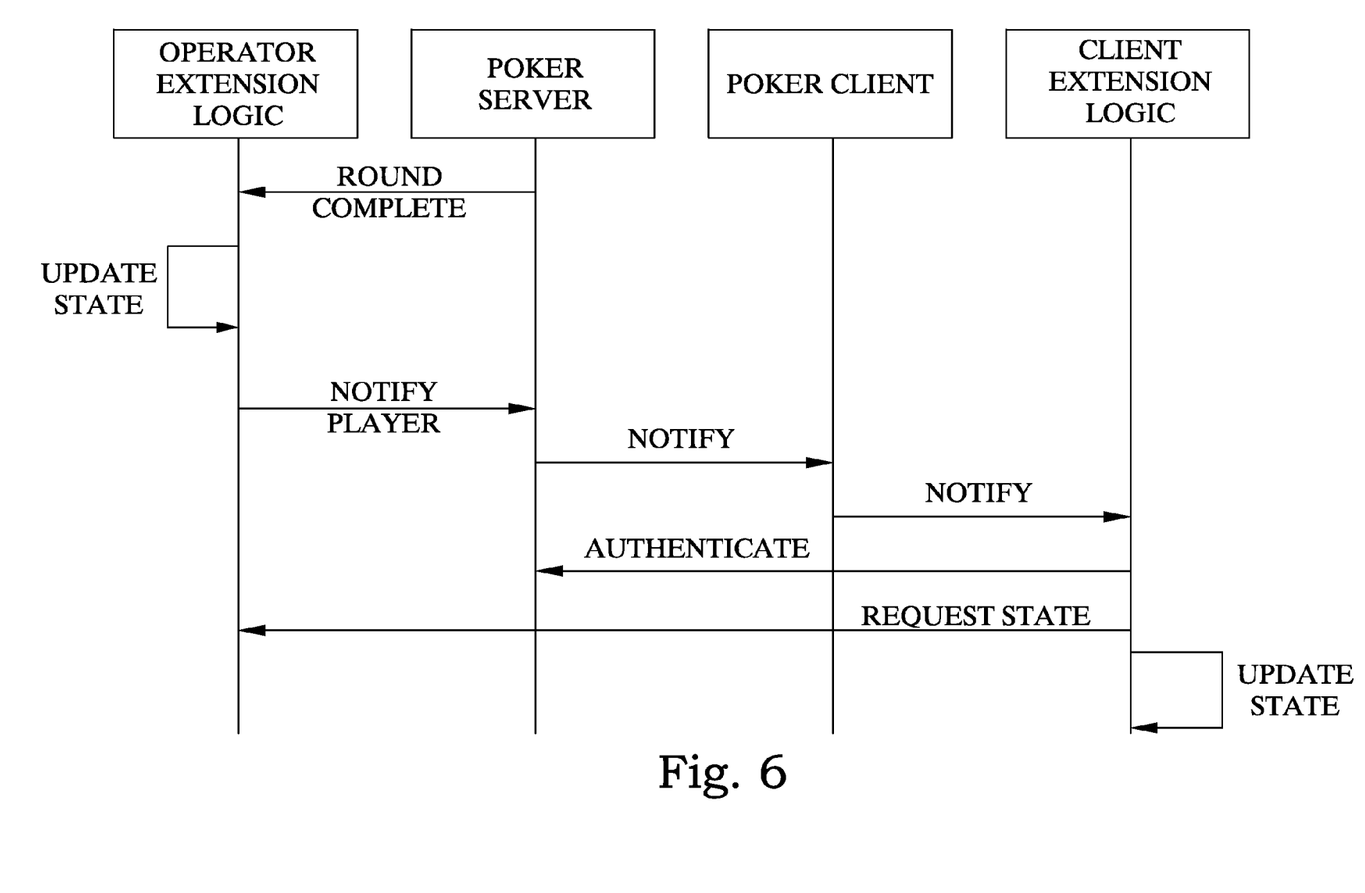
FIG. 6 is a schematic flow chart of signaling in a system according to the present invention.

The calculation of luck is handled on the server-side as new rounds are published by the B2B poker server. For given situations the logic will update the luck value for the player and notify the client to update the graphical meter. This scenario is shown in the sequence diagram in FIG. 6.

The client side bad-beat-o-meter is contained by the B2B poker client but still capable of acting on operator specific data pushed from the server side. The B2B poker platform provides the necessary hooks and mechanisms for initiating communication but does not interfere with the actual communication once established.

Another way of viewing the above described problems and solutions is to consider the question: Is it possible to enable new non-core functionality without upgrading the software version? Most of the times it is not a question of adding new functionality but enabling or disabling functionality based on the authorization of the end users e.g. client. Furthermore there is a need to make the loaded extensions communicate and interact with the system and events generated from the system. The present invention mainly focuses on downloadable client extensions that are plugged into the client software and interact with the server/client through either subscription mechanism to the game events and model or/and take action upon other external events.

The solution according to the present invention proposes a set of API:s (Application Programming Interfaces) and a framework in order to enable executing the extension applications or software in a so called sandbox environment. Typically, a sandbox in the context of the present invention provides a tightly controlled set of resources (servers, disks, units, software) for client applications to run in, where access to the core system is severely restricted and controlled. An API is a set of rules for how a certain application or functionality in a system communicates with another application or functionality in the system. Once the client is loaded and initiated in the sandbox area, all communication will take place through the provided framework.

Since the client software might run on different platform and runtime environments, the implementation requires different sort of deliveries and libraries. However, the concept remains the same. For the purpose of this proposal, the concepts and solutions are described for Java environment runtime.

Figure 7:
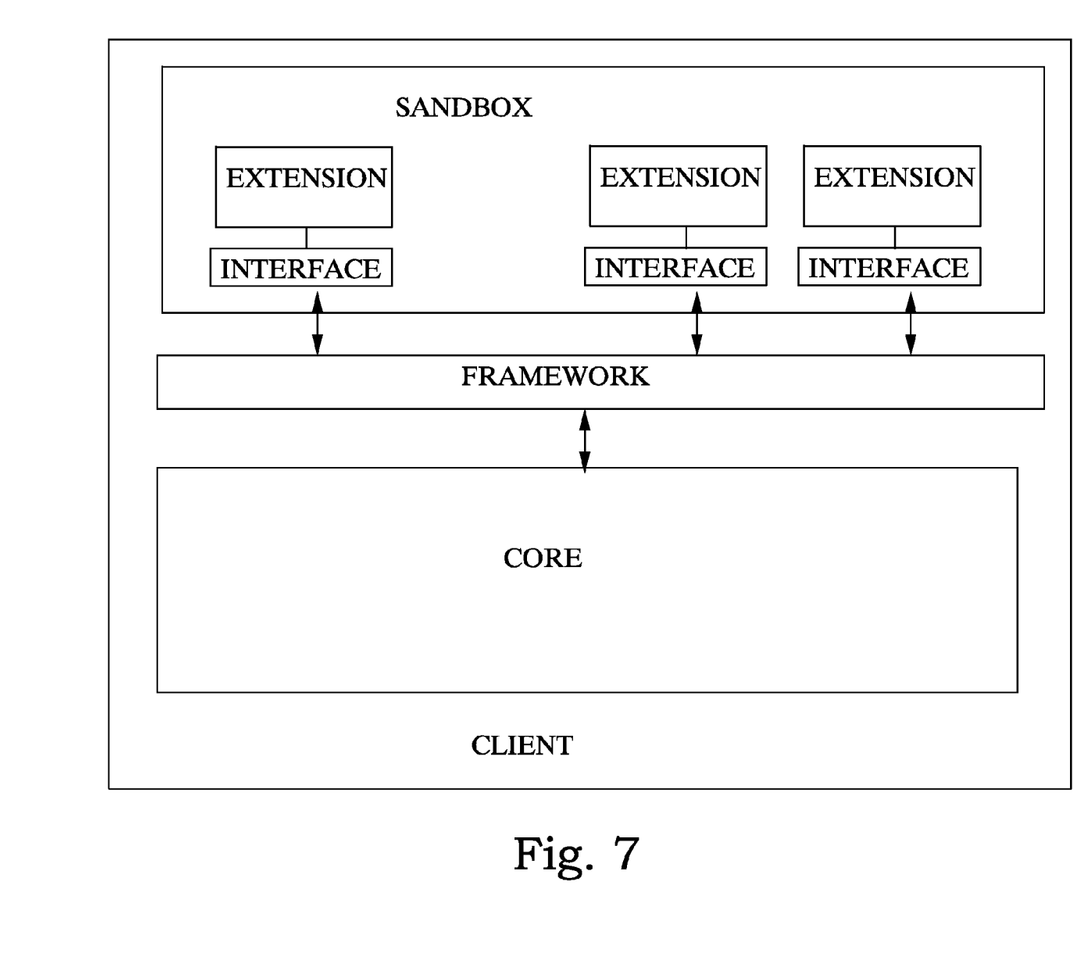
FIG. 7 is an illustration of an embodiment of a poker client according to the present invention.

The environment is depicted as in FIG. 7. The extension is loaded in the sandbox when the client application e.g. poker client application boots up. The prerequisite is that the extension is either uploaded from the extension area (on the gaming platform) or it is registered through a registry service with the information about where it can be fetched. The sandbox provides an environment for the extension software to be executed in. It applies a set of rules and principles that are used when the framework and extension are interacting with each other in order to limit and prevent usage of certain functions and resources outside of the sandbox. It is important to note that all interaction from the sandbox goes through the framework.

The extension software should comply with a certain interface. The interface is depicted in the following code block:

```
public interface ExtensionInterface
{
    /**
     * Returns a Java property object containing the info about
     * the extension, such as version, provider, company, site,
    etc.
     * @return information that provider whishes to show
     */
    Properties getInfo( );
    /**
     * Call to this method should result in initialization
     * needed by the extension
     * @param context The context in which the extension may
    communicate
     *   with the framework and security constraints applied for
     *   the extenstion. Context also contains information about
     *   the environment that the extension is executing in, such
    as
     *   loggin directory or other configuration files.
     *   This function may be invoked when the client is
    initializing.
     */
    void initialize(Context context);
    /**
     * Start the extension functionality. This is a signal from
    the
     * framework to the extension to indicate that the client is
    now
     * initialized and ready to serve the extension
     */
    void start( );
    /**
     * Signal to the extension to indicate to quit
     */
    void exit( );
    /**
     * Accept notification from the framework
     * @param message the message containing the notification
     */
    void onMessage(Message message);
}
```

The initialize( )method accepts a Context parameter. This class provides all information and facilities the extension needs to communicate to the framework.

The Context class is described as below:

```
public Interface ContextInterface
{
    /**
     * Subscribe to an event.
     * @param me the handle to the extenstion
     * @param eventType the type of event the subscription is for
     */
    void subscribe(ExtensionInterface me, EventType eventType);
    /**
     * Unsubscribe from an event
     * @param me The extension that unsubscribes to the event
     * @param eventType the type of event the subscription is for
     */
    void unSubscribe(ExtensionInterface me, EventType eventType);
    /**
     * Allocate a resource, this can be a socket, a GUI component
     * or any other type of available support
     * @param resourseType The typr of resource that needs to be
    allocated
     * @return The allocated resource
     */
    Resource allocateResource(ResourseType resourseType);
    /**
     * Release an alreqdy allocated resource
     * @param resource the resource to be released
     */
    void releaseResource(Resourse resource);
    /**
     * Get a handle to security manager in the sandbox
     * @return The security manager in the sandbox
     */
    SecurityManager getSecurityManager( );
    /**
     * Fetches the accessable resources from the framework
     * @return a list of available and accessable resources
     */
    List<Resource> getAccessableResources( );
    ...
}
```

In order to subscribe to an event e.g. TournamentStart event, the client will use the subscribe( )method to get notifications on this kind of event. The framework will notify the extension through the onMessage( )method in the Extension-Interface as soon as such an event takes place in the gaming platform and the client software is notified about it. The extension code may then take an action connected to this event to for example change an Avatar icon to another one in a certain area of the client application graphical user interface. This is done by requesting a Resource of a certain type from the framework.

The framework may provide different kind of resources to an extension. There might be certain areas in the client application graphical user interface that are dedicated to be used by the extensions (or certain kind of extensions). Other graphical user interface components such as buttons, panels, frames, etc. may be considered as resources that are available for the extensions. The list of available resources may be fetched with the method getAccessableResources( ) via the Context class. A socket or a channel for communication with external resources might also be considered as resources.

Figure 8:
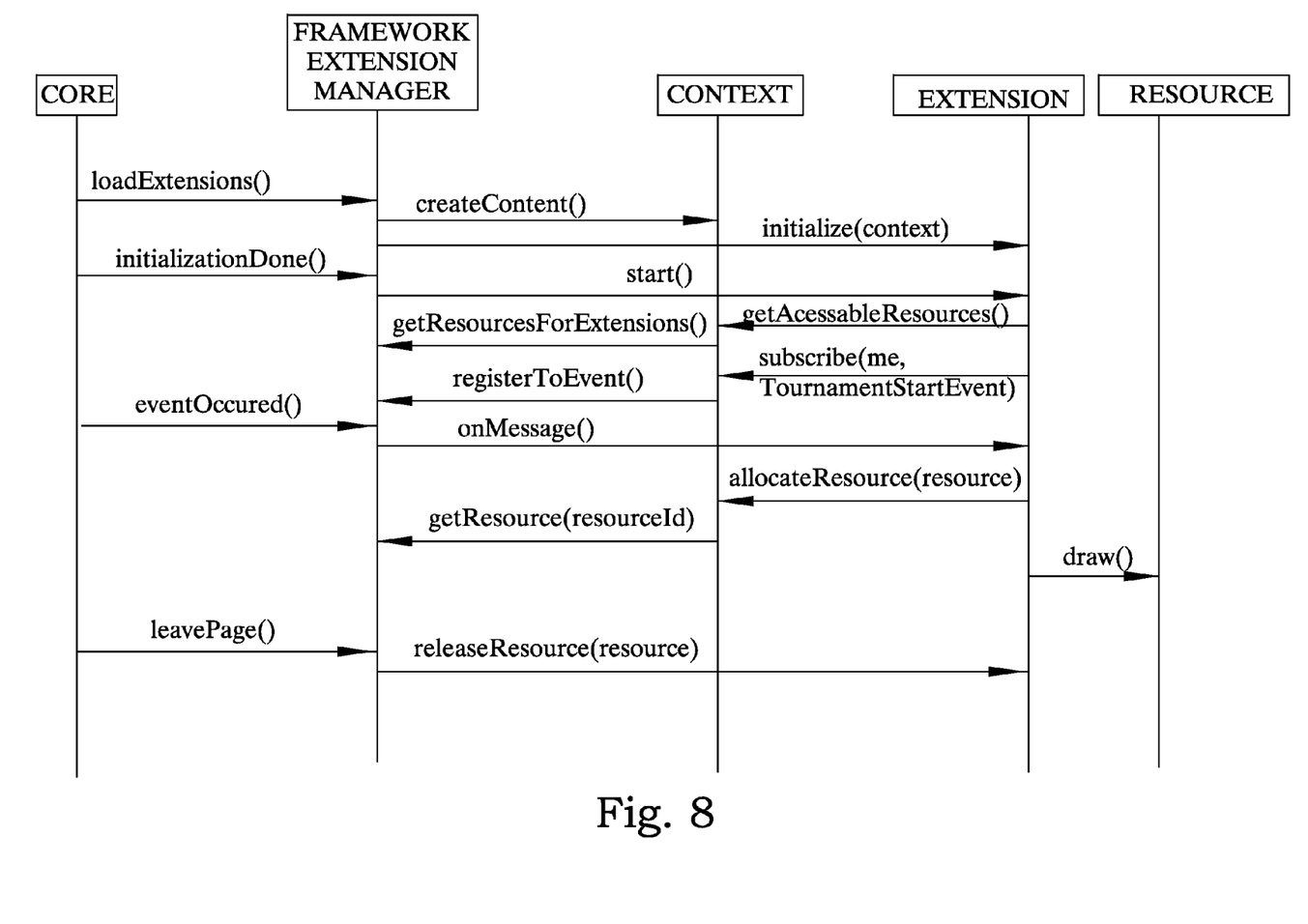
FIG. 8 is a schematic flow chart of signaling in an embodiment of a system according to the present invention.

The following sequence diagram, with reference to FIG. 8, depicts the interaction between the involved components in the extension handling process. The example scenario shows loading of the exception and the extension changing an Avatar icon in the client application's graphical user interface based on an event that marks a tournament start.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The presented solution has a number of benefits compared to traditional plug-in architectures:
Allow extensions to consist of both client- and server-side components.
Support for server-side push of information, using consistent and versioned communication channels.
The framework does not restrict extensions. Initialization, integration, and runtime operation of extensions is strictly controlled by the framework for security and quality control reasons. The framework does however not limit actual extension logic.

The invention claimed is:

1. A system comprising:
a poker gaming server associated with an online poker game;
at least one poker client connected to the poker gaming server, the poker client configured to participate in the online poker game, wherein the poker client comprises a plug-in; and
a plug-in server associated with the plug-in, wherein the plug-in server is external to the poker gaming server;
wherein the poker gaming server is configured to:
transmit gaming data about the online poker game to the plug-in server, the gaming data relating to the poker client,
receive, from the plug-in server, a client notification destined for the poker client, and
forward the client notification to the poker client,
wherein the plug-in server is configured to:
receive the gaming data from the poker gaming server, and
in response to receiving the gaming data, transmit the client notification to the poker gaming server, and wherein the poker client is configured to:
receive the client notification forwarded from the poker gaming server,
process the client notification, and
in response to the processing of the client notification, communicate directly with the plug-in server when providing functionality of the plug-in,
wherein the poker gaming server is further configured to authenticate a request received from the poker client to access the plug-in at the poker client, and
wherein the poker client is further configured to transmit the request to access the plug-in in response to the processing of the client notification.

2. The system of claim 1, wherein the poker client is further configured to transmit the request to access the plug-in during a start up procedure when the poker client initially connects to the poker gaming server.

3. The system of claim 1, wherein the poker gaming server is further configured to maintain a list of plug-ins associated with the plug-in server, and the list identifies the plug-in at the poker client.

4. The system of claim 1, wherein the poker gaming server is further configured to:
receive an additional client notification destined for an additional poker client, wherein the additional poker client is not connected to the poker gaming server; and
discard the additional client notification.

5. The system of claim 1, wherein the poker gaming server is further configured to maintain and update a list of poker clients connected to the poker gaming server.

6. A method of extending functionality of a poker gaming server, the poker gaming server being associated with an online poker game with at least one poker client, and the poker client comprising a plug-in, the method comprising:
the poker gaming server transmitting gaming data about the online poker game to a plug-in server associated with the plug-in, wherein the plug-in server is external to the poker gaming server;
upon receiving the gaming data, the plug-in server transmitting a client notification to the poker gaming server, wherein the client notification is destined for the poker client;
the poker gaming server forwarding the client notification to the poker client;
the poker client processing the client notification; and
the poker client communicating directly with the plug-in server when providing functionality of the plug-in,
the method further comprising the poker gaming server authenticating a request to access the plug-in, wherein the request is received from the poker client,
wherein request to access the plug-in is transmitted by the poker client in response to the processing of the client notification.

7. The method of claim 6, wherein the request to access the plug-in is received at the poker gaming server during a start up procedure when the poker client initially connects to the poker gaming server.

8. The method of claim 6, further comprising:
the poker gaming server maintaining a list of plug-ins associated with the plug-in server, wherein the list identifies the plug-in at the poker client.

9. The method of claim 6, further comprising:
the poker gaming server receiving an additional client notification destined for an additional poker client, wherein the additional poker client is not connected to the poker gaming server; and the poker gaming server discarding the additional client notification.

10. The method of claim 6, further comprising:
the poker gaming server maintaining and updating a list of poker clients connected to the poker gaming server.

11. A system comprising:
a poker gaming server associated with an online poker game;
at least one poker client connected to the poker gaming server, the poker client configured to participate in the online poker game, wherein the poker client comprises a plug-in; and
a plug-in server associated with the plug-in, wherein the plug-in server is external to the poker gaming server;
wherein the poker gaming server is configured to:
transmit gaming data about the online poker game to the plug-in server, the gaming data relating to the poker client,
receive, from the plug-in server, a client notification destined for the poker client, and
forward the client notification to the poker client,
wherein the plug-in server is configured to:
receive the gaming data from the poker gaming server, and
in response to receiving the gaming data, transmit the client notification to the poker gaming server, and
wherein the poker client is configured to:
receive the client notification forwarded from the poker gaming server,
process the client notification, and
in response to the processing of the client notification, communicate directly with the plug-in server when providing functionality of the plug-in,
wherein the poker gaming server is further configured to:
receive an additional client notification destined for an additional poker client, where the additional poker client is not connected to the poker gaming server; and
discard the additional client notification.

12. The system of claim 11, wherein the poker gaming server is further configured to authenticate a request received from the poker client to access the plug-in at the poker client.

13. The system of claim 12, wherein the poker client is further configured to transmit the request to access the plug-in during a start up procedure when the poker client initially connects to the poker gaming server.

14. The system of claim 12, wherein the poker gaming server is further configured to maintain a list of plug-ins associated with the plug-in server, and the list identifies the plug-in at the poker client.

15. The system of claim 12, wherein the poker client is further configured to transmit the request to access the plug-in in response to the processing of the client notification.

16. The system of claim 11, wherein the poker gaming server is further configured to maintain and update a list of poker clients connected to the poker gaming server.

17. A method of extending functionality of a poker gaming server, the poker gaming server being associated with an online poker game with at least one poker client, and the poker client comprising a plug-in, the method comprising:
the poker gaming server transmitting gaming data about the online poker game to a plug-in server associated with the plug-in, wherein the plug-in server is external to the poker gaming server;
upon receiving the gaming data, the plug-in server transmitting a client notification to the poker gaming server, wherein the client notification is destined for the poker client;
the poker gaming server forwarding the client notification to the poker client;
the poker client processing the client notification; and
the poker client communicating directly with the plug-in server when providing functionality of the plug-in,
the method further comprising:
the poker gaming server receiving an additional client notification destined for an additional poker client, where the additional poker client is not connected to the poker gaming server; and
the poker gaming server discarding the additional client notification.

18. The method of claim 17, further comprising:
the poker gaming server authenticating a request to access the plug-in, wherein the request is received from the poker client.

19. The method of claim 18, wherein the request to access the plug-in is transmitted by the poker client in response to the processing of the client notification.

20. The method of claim 18, wherein the request to access the plug-in is received at the poker gaming server during a start up procedure when the poker client initially connects to the poker gaming server.

21. The method of claim 18, further comprising:
the poker gaming server maintaining a list of plug-ins associated with the plug-in server, wherein the list identifies the plug-in at the poker client.

22. The method of claim 17, further comprising:
the poker gaming server maintaining and updating a list of poker clients connected to the poker gaming server.

* * * * *